United States Patent [19]
Lesser et al.

[11] Patent Number: 5,839,447
[45] Date of Patent: Nov. 24, 1998

[54] CIGARETTE FILTER CONTAINING MICROCAPSULES AND SODIUM PYROGLUTAMATE

[76] Inventors: Craig Lesser, 12475 Ridge Rd., Middletown, Calif. 95461; Reid W. Von Borstel, 10301 S. Glen Rd., Potomac, Md. 20854

[21] Appl. No.: 739,316

[22] Filed: Oct. 31, 1996

Related U.S. Application Data

[63] Continuation of PCT/US95/16486, Dec. 19, 1995, continuation-in-part of Ser. No. 2,951, Jan. 11, 1993, abandoned, Ser. No. 363,975, Dec. 23, 1994, Pat. No. 5,501,238, Ser. No. 543,050, Oct. 13, 1995, abandoned, and Ser. No. 648,314, May 15, 1996, Pat. No. 5,746,231.

[51] Int. Cl.$^6$ ....................................................... A24D 3/00
[52] U.S. Cl. ............................................................. 131/331
[58] Field of Search ................................... 131/331–335, 131/337

[56] References Cited

U.S. PATENT DOCUMENTS

| | | |
|---|---|---|
| 3,279,476 | 10/1966 | Noznick et al. . |
| 3,313,305 | 4/1967 | Noznick et al. . |
| 3,658,070 | 4/1972 | Diluzio . |
| 3,674,540 | 7/1972 | Pergaminos . |
| 3,884,246 | 5/1975 | Walker . |
| 3,886,955 | 6/1975 | Johnson et al. . |
| 3,982,897 | 9/1976 | Scheinberg . |
| 4,037,607 | 7/1977 | Grossman . |
| 4,076,031 | 2/1978 | Grossman . |
| 4,092,333 | 5/1978 | Mookherjee et al. . |
| 4,096,158 | 6/1978 | Evers et al. . |
| 4,126,708 | 11/1978 | Mookherjee et al. . |
| 4,138,413 | 2/1979 | Mookherjee et al. . |
| 4,156,431 | 5/1979 | Epstein et al. . |
| 4,194,517 | 3/1980 | Borowski . |
| 4,248,251 | 2/1981 | Bryant, Jr. et al. . |
| 4,257,430 | 3/1981 | Collins et al. . |
| 4,258,730 | 3/1981 | Tsukamoto . |
| 4,260,523 | 4/1981 | Tsukamoto . |
| 4,333,484 | 6/1982 | Keritsis . |
| 4,414,988 | 11/1983 | Yagi . |
| 4,438,775 | 3/1984 | Mays et al. . |
| 4,489,739 | 12/1984 | Mattina, Jr. et al. . |
| 4,506,684 | 3/1985 | Keritsis . |
| 4,508,525 | 4/1985 | Berger . |
| 4,532,947 | 8/1985 | Caseley . |
| 4,537,204 | 8/1985 | Gaisch et al. . |
| 4,612,942 | 9/1986 | Dobberstein et al. . |
| 4,761,277 | 8/1988 | Valdes et al. . |
| 4,763,674 | 8/1988 | Lelah . |
| 4,896,683 | 1/1990 | Cohen et al. . |
| 4,946,968 | 8/1990 | Krimmer et al. . |
| 4,964,426 | 10/1990 | Lee et al. . |
| 5,009,239 | 4/1991 | Cohen et al. . |
| 5,058,607 | 10/1991 | Carter et al. . |
| 5,060,672 | 10/1991 | Irimi et al. . |
| 5,218,096 | 6/1993 | Shibuya et al. . |
| 5,249,588 | 10/1993 | Brown et al. . |
| 5,501,238 | 3/1996 | Von Borstel et al. ................... 131/331 |

FOREIGN PATENT DOCUMENTS

| | | |
|---|---|---|
| 2149674 | 3/1973 | France . |
| 2702234 | 7/1978 | Germany . |
| 57-138375 | 8/1982 | Japan . |
| 1163832 | 6/1985 | U.S.S.R. . |
| 1305369 | 1/1973 | United Kingdom . |
| 1435504 | 5/1976 | United Kingdom . |

*Primary Examiner*—Mickey Yu
*Assistant Examiner*—Kelly O'Hara
*Attorney, Agent, or Firm*—David A. Farah; Sheldon & Mak

[57] ABSTRACT

A tobacco smoke filter with a porous substrate having a humectant, such as sodium pyroglutamate, dispersed therein to absorb moisture from the tobacco smoke thereby wet-filtering the tobacco smoke. Also, a tobacco smoke filter with a porous substrate having microcapsules dispersed therein. The microcapsules have a humectant such as sodium pyroglutamate. The microcapsules further preferably have one or more of methylcellulose, chlorophyllin and at least one vegetable oil.

17 Claims, No Drawings

CIGARETTE FILTER CONTAINING MICROCAPSULES AND SODIUM PYROGLUTAMATE

CROSS-REFERENCE TO RELATED APPLICATIONS

The present application is a continuation of PCT application PCT/US95/16486, entitled CIGARETTE FILTER CONTAINING MICROCAPSULES, filed Dec. 19, 1995, currently pending, which is a Continuation-in-Part of U.S. patent application Ser. No. 08/002,951 entitled CIGARETTE FILTER CONTAINING A HUMECTANT, filed Jan. 11, 1993 (now abandoned), U.S. patent application Ser. No. 08/363,975, entitled CIGARETTE FILTER CONTAINING A HUMECTANT, filed Dec. 23, 1994, now U.S. Pat. No. 5,501,238, U.S. patent application Ser. No. 08/543,050, entitled CIGARETTE FILTER CONTAINING A HUMECTANT, filed Oct. 13, 1995, now abandoned, U.S. patent application Ser. No. 08/648,314, entitled TOBACCO SMOKE FILTER FOR REMOVING TOXIC COMPOUNDS, filed May 15, 1996, now U.S. Pat. No. 5,746,231, the contents of which are incorporated herein by reference in their entirety.

BACKGROUND

It is widely known that tobacco smoke contains toxic and mutagenic compounds which cause substantial morbidity and mortality to smokers. Attempts to reduce the amount of toxic and mutagenic compounds that reach the smoker include tobacco smoke filters positioned between the burning tobacco and the smoker.

Conventional filters are made of cellulose acetate, with or without activated charcoal. These conventional filters, however, are only partially effective in reducing the amount of toxic and mutagenic compounds reaching the smoker. Further, conventional filters disadvantageously remove flavor compounds, thereby decreasing acceptance by the smoker.

There is, therefore, a need for an improved filter for a smokable device that more completely removes toxic and mutagenic compounds from tobacco smoke. Further, there is a need for an improved filter which allows the passage of flavor compounds while substantially removing toxic and mutagenic compounds for tobacco smoke. Such an improved filter would preferably be simple and inexpensive to manufacture, and convenient to use.

SUMMARY

The present invention is directed to a tobacco smoke filter that meets these needs. In one embodiment, the filter comprises a porous substrate having a humectant, such as sodium pyroglutamate, dispersed therein. The humectant absorbs moisture from the tobacco smoke and thus serves to wet-filter the tobacco smoke during use.

In another aspect, the present invention is directed to a tobacco smoke filter comprising a porous substrate having microcapsules dispersed therein. The microcapsules comprise a core and a shell. The shell comprises a humectant, preferably sodium pyroglutamate. The shell further preferably comprises methylcellulose. The core preferably comprises chlorophyllin. The core further preferably comprises at least one vegetable oil.

The filters of the present invention can additionally comprise at least one surfactant or at least one substance which aids in the removal of toxic and mutagenic compounds from tobacco smoke.

The filters of the present invention can be provided by themselves or in combination with a smokable device having a body of tobacco, such as a cigarette, cigar or pipe.

These and other features of the present invention will become better understood from the following description and appended claims.

DESCRIPTION

According to one aspect of the present invention, there is provided a filter for tobacco smoke. In a preferred embodiment, the filter is affixed to a smokable device having a body of tobacco such as a cigarette, cigar or pipe.

The filter comprises a porous substrate and at least one humectant. The porous substrate can be any non-toxic material suitable for use in filters for smokable devices that are also suitable for incorporation with a humectant. Such materials include cellulosic fiber such as cellulose acetate, cotton, wood pulp, and paper; and polyesters, polyolefins, ion exchange materials and other materials as will be understood by those with skill in the art with reference to the disclosure herein.

The humectant is capable of absorbing moisture from tobacco smoke and releasing it into the porous substrate such that tobacco smoke passing through the filter is wet-filtered thereby. In a preferred embodiment, the humectant is present in an amount of from about 5 to about 60% by dry weight of the filter.

The humectant can be any suitable humectant. For example, the humectant can be selected from the group consisting of glycerol, sorbitol, propylene glycol, sodium lactate, calcium chloride, potassium phosphate, sodium pyrophosphate or sodium polyphosphate, calcium citrate, calcium gluconate, potassium citrate, potassium gluconate, sodium tartrate, sodium potassium tartrate, and sodium glutamate.

In a preferred embodiment, the humectant incorporated into the filter is sodium pyroglutamate (also known as sodium 2-pyrrolidone-5-carboxylate or NaPCA). Advantageously, sodium pyroglutamate is non-toxic, effective at removing charged particles from tobacco smoke and functions as a humectant in the temperature range of tobacco smoke. Further, it is non-hazardous, stable, simple to manufacture and convenient to use. Sodium pyroglutamate has the following structure:

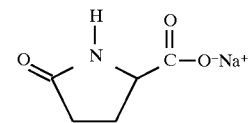

Filters according to the present invention are simple and inexpensive to manufacture. In one method of manufacture, a solution containing the humectant, such as sodium pyroglutamate, is prepared. Then, the porous substrate is wetted with the solution. The wetted substrate is then dried, leaving a residue of the humectant dispersed on or in the porous substrate.

These and other advantages of the present invention are demonstrated by the following comparative example.

EXAMPLE I

Comparison of Effectiveness Between Conventional Tobacco Smoke Filter, Wet-Filtration Tobacco Smoke Filter Containing Sodium Pyroglutamate and Commercially Available Wet-Filtration Tobacco Smoke Filter Three types of filters were tested for relative effectiveness in removing tar from cigarette smoke:

1) Conventional cellulose acetate filter ("Cell-Ac");
2) Wet-filtration tobacco smoke filter containing cellulose acetate with sodium pyroglutamate ("SoPyro") according to the present invention; and
3) Commercially available wet-filtration tobacco smoke filter ("Aquafilter").

Cellulose acetate filters containing sodium pyroglutamate were prepared by, first, removing cellulosic filters from commercial cigarettes. The fibers weighed approximately 0.21 g. Next, approximately 0.5 ml of a 10% by weight solution of sodium pyroglutamate was applied to each filter, and the filter was dried overnight at 60° C.

The conventional cellulose acetate filter and the cellulose acetate filters containing sodium pyroglutamate were weighed and inserted into a 3.75 cm (1.5 inch) segment of polycarbonate tubing having an inside diameter identical to the outside diameter of a standard cigarette. A filterless cigarette having 0.85 g of tobacco was inserted into one end of the polycarbonate tubing in proximity to one end of the filter. The other end of the polycarbonate tubing was attached to tubing connected to a suction pump. Duplicates of each filter type were tested. Aquafilters used in this test were also attached to a filterless cigarette having 0.85 g of tobacco and then attached to tubing connected to a suction pump.

The filtered cigarettes were lit and intermittent suction, simulating inhalation of cigarette smoke, was applied until the cigarette had burned to within 0.5 inch of the unlit end. The filters were removed from either the polycarbonate tube or from the Aquafilter, weighed, and placed in 10 ml of methanol to elute tar and other substances from the smoke that were retained in the filter. Light absorbance (at a wavelength of 350 nm) of the ethanolic filter eluates was used as an index of the amount of smoke components retained on the filters. The weight gained by the filters during smoke passage was also recorded. The results of the test are presented in Table 1.

TABLE 1

| TEST | FILTER | ABSORBANCE at 350 nm | Weight Gain |
| --- | --- | --- | --- |
| 1 | Cell-Ac | 0.470 A.U. | 35 mg |
| 2 | Cell-Ac | 0.381 A.U. | 30 mg |
| 3 | SoPyro | 0.731 A.U. | 71 mg |
| 4 | SoPyro | 0.625 A.U. | 60 mg |
| 5 | Aquafilter | 0.540 A.U. | * |
| 6 | Aquafilter | 0.560 A.U. | * |

*The weight gain due to absorbance of smoke components on the Aquafilter could not be determined, since the Aquafilter actually lost weight during passage of smoke, presumably due to evaporation of water.

*The weight gain due to absorbance of smoke components on the Aquafilter could not be determined, since the Aquafilter actually lost weight during passage of smoke, presumably due to evaporation of water.

Based on the absorbance data, the filters according to one aspect of the present invention (Tests 3 and 4) are significantly more effective than conventional cellulose acetate filters without the humectant (Tests 1 and 2), and also more effective than the Aquafilter (Tests 5 and 6)

According to another aspect of the present invention, there is provided a filter for tobacco smoke comprising a porous substrate having microcapsules dispersed therein. The microcapsules preferentially include an inner core with an outer shell.

The core of the microcapsules comprise at least one vegetable oil. Suitable vegetable oils include at least one oil selected from the group consisting of castor oil, cotton seed oil, corn oil, sunflower oil, sesame oil, soybean oil, and rape oil. In a preferred embodiment, the vegetable oil is safflower oil. Other oils are also suitable, as will be understood by those with skill in the art with reference to the disclosure herein. In a preferred embodiment, the vegetable oil is present in an amount of from about 20% to about 80% by dry weight of the microcapsules, and more preferably from about 30% to about 70% by dry weight of the microcapsules.

In a preferred embodiment, the microcapsule cores also contain chlorophyllin. When present, the chlorophyllin is preferably in an amount of from about 1 to about 10% by dry weight of the microcapsules, and more preferably from about 2% to about 5% by dry weight of the microcapsules.

The microcapsule shells comprise a humectant. In a preferred embodiment, the humectant is sodium pyroglutamate, though other humectants can be used as will be understood by those with skill in the art with reference to the disclosure herein. In a preferred embodiment, the humectant, such as sodium pyroglutamate, is present in an amount of from about 10 to about 90% by dry weight of the microcapsules, and more preferably from about 20 to about 70% by dry weight of the microcapsules.

In another preferred embodiment, the microcapsule shells also comprise methylcellulose. In a preferred embodiment, the methylcellulose is present in an amount of from about 5 to about 30% by dry weight of the microcapsules, and more preferably from about 10 to about 25% by dry weight of the microcapsules.

In another preferred embodiment, the microcapsule shells also comprise a polymeric agent such as polyvinylalcohol or polyvinyl pyrrolidone, or can comprise both polyvinylalcohol or polyvinyl pyrrolidone, in addition to methylcellulose or in place of methylcellulose. In a preferred embodiment, the polymeric agent is present in an amount of from about 2 to about 30% by dry weight of the microcapsules, and more preferably from about 5 to about 20% by dry weight of the microcapsules.

Compounds used in formulation of microcapsules according to the present invention are available from a variety of sources known to those with skill in the art, such as Sigma Chemical Co., St. Louis, Mo. USA.

Microcapsules suitable for use in the present invention can be made according to a variety of methods known to those with skill in the art. For example, microcapsules according to the present invention can be produced by combining 200 g of vegetable oil with 500 g of an aqueous suspension comprising 25 g of low-viscosity methylcellulose, 5 g of chlorophyllin, 50 g of sodium pyroglutamate and 150 g of corn starch in water. The mixture is emulsified and spray-dried to form microcapsules.

Microcapsules according to the present invention can be formed by spray drying methods at the site of cigarette manufacturing machinery by spraying onto sheets of cellulose acetate filter tow before the tow is formed into cylindrical filters. Alternatively, suitable microcapsules can be premanufactured and added to sheets of cellulose acetate filter tow by dropping the microcapsule onto the tow with a vibrating pan or by other techniques as will be understood by those with skill in the art with reference to the disclosure herein.

As will be appreciated by those with skill in the art, the manufacture of filters containing microcapsules according to the present invention will require only minor modification of conventional filter-cigarette manufacturing equipment. Further, the manufacture of filters containing microcapsules according to the present invention is only marginally more expensive than conventional filters.

In use, the humectant portion of the microcapsules traps moisture from tobacco smoke passing through the filter. Sodium pyroglutamate is particularly preferred because it can be incorporated into the filter in a dry form.

When present, the oil portion of the microcapsules traps certain harmful volatile compounds like pyridine without impeding the flow of flavor and aroma producing compounds. When present, chlorophyllin is a potent inactivator of carcinogenic components of tobacco smoke.

The methylcellulose portion of the microcapsules imparts structural stability to the microcapsules but disperses upon warming and when exposed to moisture. Unlike most commonly used viscosity-imparting substances, methylcellulose precipitates from warm solutions. Further, it is soluble at lower temperatures than most commonly used viscosity-imparting substances.

When tobacco smoke filters containing microcapsules comprising a shell of sodium pyroglutamate and methylcellulose and a core of vegetable oil and chlorophyllin, according to the present invention, filter tobacco smoke, the microcapsules capture heat and moisture from the tobacco smoke. The methylcellulose precipitates into a fibrous material which increases the effective surface area available for wet-filtration of the tobacco smoke. This allows the moisture retained by the sodium pyroglutamate to rapidly disperse into the filter material. The chlorophyllin partitions approximately evenly between the aqueous and oil environments, allowing increased inactivation of both particulate and vapor-phase toxic and mutagenic compounds of tobacco smoke than if the chlorophyllin was available in only one phase.

According to another aspect of the present invention, there is provided a cigarette filter comprising copper phthalocyanine trisulfonate. This compound can be added directly to tobacco smoke filters. Alternatively, the copper phthalocyanine trisulfonate can be incorporated into a tobacco smoke filter as a covalently bound ligand to cotton, such as "blue cotton", or to rayon or other suitable material. Also alternatively, copper phthalocyanine trisulfonate can be added to other tobacco smoke filter embodiments of the present invention. In a preferred embodiment, the copper phthalocyanine trisulfonate is present in an amount of from about 0.1 to about 5% by dry weight of the filter whether free or covalently bound. In a particularly preferred embodiment, the copper phthalocyanine trisulfonate is present in an amount of from about 1 to about 3% by dry weight of the filter. In use, this compound functions to remove toxic and mutagenic compounds present in tobacco smoke such as carcinogenic polycyclic aromatic hydrocarbons.

In another preferred embodiment, the filters of the present invention additionally comprise at least one surfactant to improve the effectiveness of wet-filtering the tobacco smoke. In a particularly preferred embodiment, the surfactant is present in an amount of from about 0.1 to about 10%, and more preferably from about 0.1 to about 2% by weight of the filter.

The surfactant is preferably nontoxic and can include one or more of the following classes of compounds: (1) a polyoxyalkylene derivative of a sorbitan fatty acid ester (i.e., polyoxyalkylene sorbitan esters), (2) a fatty acid monoester of a polyhydroxy-alcohol, or (3) a fatty acid diester of a polyhydroxy alcohol, though other suitable surfactants will be understood by those with skill in the art with reference to the disclosure herein. Examples of suitable surfactants include ethoxylates, carboxylic acid esters, glycerol esters, polyoxyethylene esters, anhydrosorbitol esters, ethoxylated anhydrosorbitol esters, ethoxylated natural fats, oils and waxes, glycol esters of fatty acids, polyoxyethylene fatty acid amides, polyalkylene oxide block copolymers, and poly(oxyethylene-co-oxypropylene). Other suitable surfactants can also be used as will be understood by those with skill in the art with reference to the disclosure herein.

The filter can additionally include other substances which filter or inactivate toxic or mutagenic components of tobacco smoke. Examples of such substances include anti-oxidants and radical scavengers such as glutathione, cysteine, N-acetylcysteine, mesna, ascorbate, and N,N'-diphenyl-p-phenyldiamine; aldehyde inactivators such as ene-diol compounds, amines, and aminothiols; nitrosamine traps and carcinogen inactivators such as ion-exchange resins, chlorophyll, chlorophyllin, copper phthalocyanine trisulfonate; and nicotine traps such as tannic acid and other organic acids. Other suitable substances can also be used as will be understood by those with skill in the art with reference to the disclosure herein. In a particularly preferred embodiment, the other substances are present in an amount of from about 0.1 to about 10%, and more preferably from about 0.1 to about 2% by weight of the filter.

Further, the filters of the present invention are preferably provided with an exterior, circumferential, moisture-impervious barrier or casing to prevent wetting of the smoker's hands. Such a barrier can be made from a polymeric material such as ethylvinyl acetate copolymer, polypropylene, or nylon, as is understood by those with skill in the art.

The filters of the present invention can be provided in combination with cigarettes or cigars or other smokable devices containing divided tobacco, being secured to one end of the smokable device. The filter can also be provided by itself, in a form suitable for attachment to a cigarette, cigar, pipe, or other smokable device.

Although the present invention has been discussed in considerable detail with reference to certain preferred embodiments thereof, other embodiments are possible. Therefore, the spirit and scope of the appended claims should not be limited to the description of the preferred embodiments contained herein.

We claim:

1. A tobacco smoke filter comprising a porous substrate having microcapsules dispersed in the filter, wherein the microcapsules comprise a core and a shell, and wherein the shell comprises sodium pyroglutamate.

2. The filter of claim 1, herein the microcapsules further comprise chlorophyllin.

3. The filter of claim 1, herein the microcapsules further comprise methylcellulose.

4. The filter of claim 1, wherein the microcapsules further comprise a vegetable oil.

5. The filter of claim 1, wherein the core comprises a vegetable oil and chlorophyllin.

6. The filter of claim 1, wherein the shell further comprises methylcellulose.

7. The filter of claim 1, wherein the core comprises vegetable oil and chlorophyllin, and wherein the shell further comprises methylcellulose.

8. A smokable device comprising the filter of claim 1 affixed to a body of tobacco.

9. A method of filtering tobacco in a smokable device, comprising the steps of:
   (a) providing a smokable device comprising the tobacco smoke filter according to claim 1, wherein the filter is affixed to a body of divided tobacco;
   (b) igniting the body of divided tobacco such that smoke passes through the body and into the filter containing the dry water; and (c) allowing the smoke to pass through the filter thereby filtering the smoke.

10. A method of making a smokable device, comprising the steps of:
   (a) providing a tobacco smoke filter according to claim 1; and
   (b) affixing the filter to a body of divided tobacco.

11. A tobacco smoke filter comprising a porous substrate having microcapsules dispersed in the porous substrate, wherein the microcapsules comprise methylcellulose and chlorophyllin.

12. The filter of claim 11, wherein the microcapsules further comprise a vegetable oil.

13. The filter of claim 11, wherein the microcapsules further comprise sodium pyroglutamate.

14. The filter of claim 11, wherein the microcapsules further comprise a humectant.

15. A smokable device comprising the filter of claim 11 affixed to a body of tobacco.

16. A method of filtering tobacco in a smokable device, comprising the steps of:
   (a) providing a smokable device comprising the tobacco smoke filter according to claim 11, wherein the filter is affixed to a body of divided tobacco;
   (b) igniting the body of divided tobacco such that smoke passes through the body and into the filter containing the dry water; and
   (c) allowing the smoke to pass through the filter thereby filtering the smoke.

17. A method of making a smokable device, comprising the steps of:
   (a) providing a tobacco smoke filter according to claim 11; and
   (b) affixing the filter to a body of divided tobacco.

* * * * *

UNITED STATES PATENT AND TRADEMARK OFFICE
CERTIFICATE OF CORRECTION

PATENT NO. : 5,839,447

DATED : November 24, 1998

INVENTOR(S) : Craig Lesser, et al.

It is certified that error appears in the above-identified patent and that said Letters Patent is hereby corrected as shown below:

Cover Sheet, in the "Related to U.S. Application Data":

Replace "Continuation of PCT/US95/16486, Dec. 19, 1995, continuation-in-part of Ser. No. 2,951, Jan. 11, 1993, abandoned, Ser. No. 363,975, Dec. 23, 1994, Pat. No. 5,501,238, Ser. No. 543,050, Oct. 13, 1995, abandoned, and Ser. No. 648, 314, May 15, 1996, Pat. No. 5,746,231." with -- Continuation of PCT/US95/16486, Dec. 19, 1995, continuation-in-part of Ser. No. 2,951, Jan. 11, 1993, abandoned, Ser. No. 363,975, Dec. 23, 1994, Pat. No. 5,501,238, Ser. No. 543,050, Oct. 13, 1995, and Ser. No. 648, 314, May 15, 1996, Pat. No. 5,746,231.--

UNITED STATES PATENT AND TRADEMARK OFFICE
CERTIFICATE OF CORRECTION

PATENT NO. : 5,839,447
DATED : November 24, 1998
INVENTOR(S) : Craig Lesser, et al.

It is certified that error appears in the above-identified patent and that said Letters Patent is hereby corrected as shown below:

Column 1, Lines 7 - 23:

Replace "The present application is a continuation of PCT application PCT/US95/16486, entitled CIGARETTE FILTER CONTAINING MICROCAPSULES, filed Dec. 19, 1995, currently pending, which is a Continuation-in-Part of U.S. patent application Ser. No. 08/002,951 entitled CIGARETTE FILTER CONTAINING A HUMECTANT, filed Jan. 11, 1993 (now abandoned), U.S. patent application Ser. No. 08/363,975, entitled CIGARETTE FILTER CONTAINING A HUMECTANT, filed Dec. 23, 1994, now U.S. Pat. No. 5,501,238, U.S. patent application Ser. No. 08/543,050, entitled CIGARETTE FILTER CONTAINING A HUMECTANT, filed Oct. 13, 1995, now abandoned, U.S. patent application Ser. No. 08/648,314, entitled TOBACCO SMOKE FILTER FOR REMOVING TOXIC COMPOUNDS, filed May 15, 1996, now U.S. Pat. No. 5,746,231, the contents of which are incorporated herein by reference in their entirety." with - - The present application is a continuation of PCT application PCT/US95/16486, entitled CIGARETTE FILTER CONTAINING MICROCAPSULES, filed Dec. 19, 1995, currently pending, which is a Continuation-in-Part of U.S. patent application Ser. No. 08/002, 951 entitled CIGARETTE FILTER CONTAINING A HUMECTANT, filed Jan. 11, 1993 (now abandoned), U.S. patent application Ser. No. 08/363,975, entitled CIGARETTE FILTER CONTAINING A HUMECTANT, filed Dec. 23, 1994, now U.S. Pat. No. 5,501,238, U.S. patent application Ser. No. 08/543,050, entitled CIGARETTE FILTER CONTAINING A HUMECTANT, filed Oct. 13, 1995, currently pending, U.S. patent application Ser. No. 08/648,314, entitled TOBACCO SMOKE FILTER FOR REMOVING TOXIC COMPOUNDS, filed May 15, 1996, now U.S. Pat. No. 5,746,231, the contents of which are incorporated herein by reference in their entirety.- -

Signed and Sealed this

Thirty-first Day of August, 1999

*Attest:*

Q. TODD DICKINSON

*Attesting Officer*   *Acting Commissioner of Patents and Trademarks*